Aug. 20, 1968 R. A. CASWELL 3,398,373

PULSE TRAIN MEDIAN ERROR DETECTOR AND COMPENSATOR

Filed Dec. 21, 1964

RAYMOND A. CASWELL
*INVENTOR.*

BY John E. Wagner

ATTORNEY

United States Patent Office 3,398,373
Patented Aug. 20, 1968

3,398,373

PULSE TRAIN MEDIAN ERROR DETECTOR AND COMPENSATOR

Raymond A. Caswell, Tujunga, Calif., assignor to Aerojet-General Corporation, El Monte, Calif., a corporation of Ohio Filed Dec. 21, 1964, Ser. No. 419,973
6 Claims. (Cl. 328—163)

ABSTRACT OF THE DISCLOSURE

This invention relates to communications receivers and more particularly to circuits for detecting and eliminating unwanted shifts in the reference voltage level of binary coded information. These circuits include basically an operational amplifier having a pair of input terminals, one which inverts signals applied thereto and the other which does not, and a single output terminal. Coupled between the output and the inverting input terminal is a feedback network having one positive and one negative peak detector and a summing circuit which algebraically combines the output of the two peak detectors for application to the inverting input of the operational amplifier. The circuit is capable of detecting the deviation in the median level of a pulse train by the feedback circuit and by adding this summation signal in inverted form to the original pulse train, the median deviation is cancelled. The feedback network also serves to limit noise present in the signal thereby improving the signal quality of the outputs as well as eliminating the median shift.

Figure 1:
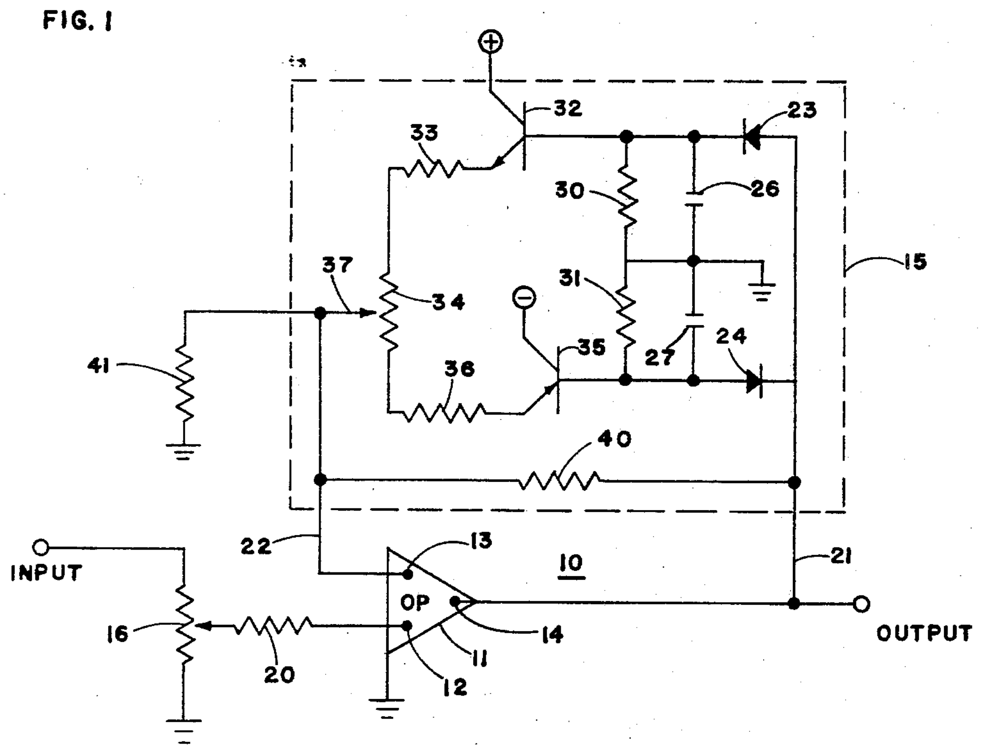

Characteristically in practical operating telemetry receiving stations for binary coded information, the received demodulated signal is a train of square waves having period or order carrying the information content and usually superimposed noise.

The successful detection of a train of binary coded waves depends not only upon the successful reception and demodulation steps but also upon the establishment of a reference voltage level with respect to which the binary "Ones" and "Zeros" may be defined. Commonly the reference used is the median level between the binary "One" and "Zero" excursions. Any deviation of the median level of the train of bits from the reference can result in the loss of one or more bits with a resultant decoding error.

In the past the compensation for such median voltage shifts has been accomplished by median detector circuits which integrate the incoming signal over a period covering a few bits and adjust the median level of the currently received signal to match the integrated median voltage level. This type of median detector, although providing an improvement over uncompensated receivers, is still susceptible to errors under noisy conditions or where the information content upon which the median level is set is asymmetrical, e.g., after code sequences such as sixteen sequential binary "Ones."

With this understanding of the state of the art in mind it is a general object of this invention to improve the performance of telemetry receivers.

More specifically, it is an object of this invention to improve median detectors for pulse code telemetry receivers.

A further object of this invention is to provide a median detector capable of eliminating any D.C. shift in a train of binary coded pulses despite high noise content of the received signal, while independent of the particular pulse code form or information content.

These objects are all accomplished in the combination of an operational amplifier having one non-inverting and one inverting input with a feedback network from the output of the operational amplifier to the inverting input thereof. A train of pulses to be D.C. shift-compensated is applied to the non-inverting input. The feedback network contains a pair of peak detectors for detecting maxima and minima and for algebraically combining the integrated output of the peak detectors and applying the amplified resultant to the operational amplifier.

A more complete understanding of this invention may be had from the following detailed description with reference to the drawing in which:

FIG. 1 is an electrical schematic of the median detector of this invention; and

Figures 2A, 2B:
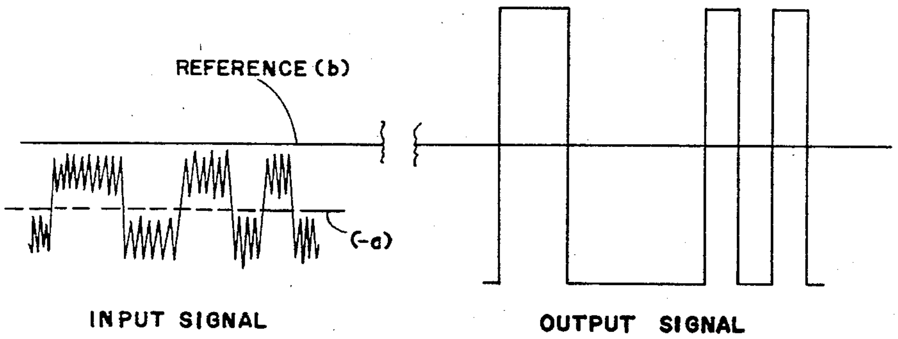

FIGS. 2*a* and 2*b* are graphical representations of typical input and output signal waveforms, respectively, of the median detector of FIG. 1.

Now referring to FIG. 1 the median detector 10 comprises basically an operational amplifier 11 having non-inverting and inverting input terminals 12 and 13 respectively and output terminal 14 and a feedback network 15 connected between the output terminal 14 and the inverting input terminal 13. The receiving signal is applied to the non-inverting input terminal 12 of operational amplifier 11 through a level control variable resistance 16 and an isolating resistance 20. The operational amplifier 11 has a nominal voltage gain of eighty decibels so that the waveform introduced at terminal 12 appears amplified and limited without phase inversion at the output terminal 14. The output of amplifier 11 is applied via lead 21 to feedback network 15 which in turn is applied to the phase inverting input 13 of amplifier 11 via lead 22.

The feedback network constituting the heart of this invention includes a pair of oppositely poled diodes 23 and 24, poled respectively to pass positive and negative excursions on lead 21. Then diode 23, cooperating with a capacitor 26 connected between the diode cathode and ground, serves as a positive peak detector. Diode 24 and a capacitor 27 connected between the anode of diode 24 and ground comprise a negative peak detector. The time constants of the peak detectors are determined by resistances 30 and 31 each in parallel with a respective capacitor 26 and 27. The positive peak detector is connected to the base of a buffer amplifier including NPN transistor 32 connected in an emitter follower configuration with the amplified output of the positive peak detector taken from the emitter resistor 33 and applied to one terminal of a summing resistor 34.

The output of the negative peak detector is similarly connected to the base of a complementary PNP transistor 35 with the amplified negative peak signal taken via an emitter resistor 36 to the opposite end of summing resistor 34.

An adjustable center tap 37 for the summing resistor 34 allows a zero adjustment to be made and via lead 22 provides the feedback return path to the inverting input terminal 13 of amplifier 11. The level of the feedback and the gain of the entire median detector are both determined by a resistance 40 connected between leads 21 and 22 and resistance 41 from the center tap 37 of summing resistance 34 to ground.

The operation of the median detector is best understood referring to FIG. 1 in connection with FIG. 2. A typical received signal appears in FIG. 2*a* comprising a nine-bit code group 110000101 with superimposed noise spikes and having a negative D.C. offset ($-a$) from the reference ($b$) after detection. In a normal system where binary "Zeros" are registered when the detected signal is below the reference and "Ones" when above the reference, this code group would be incorrectly registered as all "Zeros." Of course, this is an extreme case and more practically speaking such an extreme D.C. offset can only be expected to occur for short durations of one or two bits but still resulting in an error.

The present median detector not only eliminates the offset but through the limiting action of the amplifier 11 produces the clear output signal of FIG. 2*b* ready for processing. This is achieved by the action of the feedback network 15 which detects both the positive and negative peaks by charging capacitors 26 and 27 to voltages corresponding to the average level of positive and negative excursions of the signal at an attack time rate of change determined primarily by the RC time constants of capacitor 26 with the emitter resistance 33 and of capacitor 27 with emitter resistance 36. A preferred attack time constant for the two peak detectors is in the order of less than one bit period, e.g., twenty-five milliseconds has been found to allow the median detector to respond to transient changes in the D.C. level of the incoming signal. The decay time of each of the peak detectors, on the other hand, is determined by the time constant of the capacitors 26 and 27 with their respective shunt resistances 30 and 31. Resistances 30 and 31 are approximately ten times larger in value than the emitter resistances 33 and 36 whereby the decay time for change on capacitors 26 and 27 is in the order of several bits duration, e.g., 2 to 2.5 seconds. This arrangement allows the median detector to exhibit rapid response to transients combined with long term stability so as to be affected only slightly by the particular information content of a bit sequence.

In the description of this invention the specific circuit illustrated is designed to provide a median detector for a data receiver designed to accept pulse coded information at rates ranging from 8 to 30,000 bits per second and at signal to noise ratios as low as −10 db. In this one embodiment the components used were as follows.

| | |
|---|---|
| Amplifier **11** | Model 9499 Burr Brown Research Corp., Tucson, Ariz. |
| Resistances: | |
| **16** | 10K ohms adjustable. |
| **20** | 100K ohms. |
| **30** | 470K ohms. |
| **31** | 470K ohms. |
| **33** | 10K ohms. |
| **34** | 2K ohms adjustable. |
| **36** | 10K ohms. |
| **40** | 100K ohms. |
| **41** | 10K ohms. |
| Capacitors: | |
| **26** | 2.5 mfd. |
| **27** | 2.5 mfd. |
| Transistors: | |
| **32** | NPN type 2N1308. |
| **35** | PNP type 2N1309. |

The embodiments of this invention described above are only illustrative of the principles of this invention and it is fully recognized that one skilled in the art, following my teaching, can devise other variants without departing from the spirit of my invention. The grant hereof therefore is not limited to the embodiment illustrated, but rather by the scope of the following claims and the equivalents thereof.

What is claimed is:

1. A pulse train median error detector and compensator circuit for detecting and eliminating D.C. shifts in a train of pulses, comprising:

a first peak detector for detecting the positive excursions of a train of pulses;

a second peak detector for detecting negative excursions of the train of pulses;

means for algebraically combining the output of said first and second peak detectors;

means for inverting the combined output of the first and second peak detectors; and means for adding the combined inverted output of said peak detector to said train of pulses.

2. A pulse train median error detector and compensator circuit in accordance with claim 1 wherein said first and second peak detectors including networks having attack time-constants in the order of less than a single pulse period and decay time-constant in the order of several pulse periods whereby the median detector responds to transient changes in median level and compensates for variations therein.

3. A pulse train median error detector and compensator circuit in accordance with claim 1 wherein said peak detectors in combination comprise:

a pair of parallel branches, one branch including a diode poled to pass positive voltage excursions, the second branch including a diode poled to pass negative voltage excursions;

means in each branch for integrating the voltage excursions over a period greater than a single voltage excursion length;

means for algebraically adding the output of said integrating means; and means for combining the inverted sum output of said adding means with the incoming pulse train.

4. The combination in accordance with claim 3 wherein said integrating means has a charging path time-constant in the order of less than a single voltage excursion duration and a discharge path time-constant of more than a single voltage excursion length.

5. A pulse train median error detector and compensator circuit comprising:

an operational amplifier having a pair of signal inverting input terminals, a pair of non-inverting input terminals and a single pair of output terminals;

means for applying a signal wave train to the non inverting input terminals;

a feedback network connected between the output terminals and the inverting input terminals of said operational amplifier;

said feedback network including a pair of peak detectors, one operative to detect positive excursions of the wave train and one operative to detect negative excursions of the wave train;

means for algebraically combining the output of said peak detectors; and means for introducing the combined output of said peak detectors into the inverting input of said operational amplifier.

6. Apparatus for detecting and eliminating unwanted shifts in reference median voltage of binary coded information comprising:

means for amplifying received binary coded pulse trains;

a pair of peak detectors connected to the output of said amplifying means for respectively detecting maximum and minimum voltage deviations of the pulse train, said peak detectors having attack time-constant constituting a small percentage of the bit period and a decay time-constant equal to several bit periods;

means for algebraically combining the output of said peak detectors; and means for algebraically combining the combined output from said peak detectors with the pulse train applied to the input of said amplifying means whereby the average median shift detected by said peak detectors is subtracted from the instantaneous signal level and any D.C. shift eliminated.

References Cited

UNITED STATES PATENTS

| | | | |
|---|---|---|---|
| 2,985,775 | 5/1961 | Sollecito | 302—88.5 |
| 2,996,613 | 8/1961 | Glomb | 328—117 X |
| 3,104,358 | 9/1963 | Heacock | 328—175 |
| 3,195,055 | 7/1965 | Dean | 328—162 |
| 3,248,569 | 4/1966 | Weekes | 302—88.5 |

JOHN S. HEYMAN, *Primary Examiner.*